United States Patent [19]

Carpenter et al.

[11] Patent Number: 5,062,509

[45] Date of Patent: Nov. 5, 1991

[54] SHIFTER MOUNTED BRAKE-TRANSMISSION INTERLOCK

[75] Inventors: Vincent N. Carpenter, Elk Rapids; William J. LaRocca, Sterling Heights, both of Mich.

[73] Assignee: Dura Mechanical Components, Inc., Troy, Mich.

[21] Appl. No.: 534,559

[22] Filed: Jun. 4, 1990

[51] Int. Cl.⁵ .............................................. B60K 41/28
[52] U.S. Cl. .................................. 192/4 A; 74/483 R; 180/271
[58] Field of Search ....................... 192/4 R, 4 A, 4 C; 74/483 R; 180/271

[56] References Cited

U.S. PATENT DOCUMENTS

| | | | |
|---|---|---|---|
| 3,994,183 | 11/1976 | Markl | 74/473 R |
| 4,473,141 | 9/1984 | Mochida | 192/1.1 |
| 4,880,092 | 11/1989 | Kito et al. | 192/4 A |
| 4,905,802 | 3/1990 | Gotoh | 192/4 A |
| 4,909,096 | 3/1990 | Kobayashi | 192/4 A X |
| 4,932,493 | 6/1990 | Sakurai et al. | 180/271 |
| 4,934,496 | 6/1990 | Barske et al. | 192/4 A |
| 4,942,937 | 7/1990 | Amberger et al. | 180/271 |
| 4,947,967 | 8/1990 | Kito et al. | 192/4 A |
| 4,966,262 | 10/1990 | Mieczkowski | 192/4 A |

Primary Examiner—Richard Lorence
Attorney, Agent, or Firm—David A. Greenlee

[57] ABSTRACT

A shifter for an automatic transmission is prevented from shifting out of park position when the ignition switch is on unless the service brake is applied. A solenoid-operated blocking member is positioned to selectively block movement of a detent pin to prevent the shift lever from leaving the park position of the shift gate. A circuit including switches responsive to ignition, service brake application and shift lever position controls solenoid activation. A cam responsive to the shift lever release button and to the lever position controls the shift lever position switch.

7 Claims, 4 Drawing Sheets

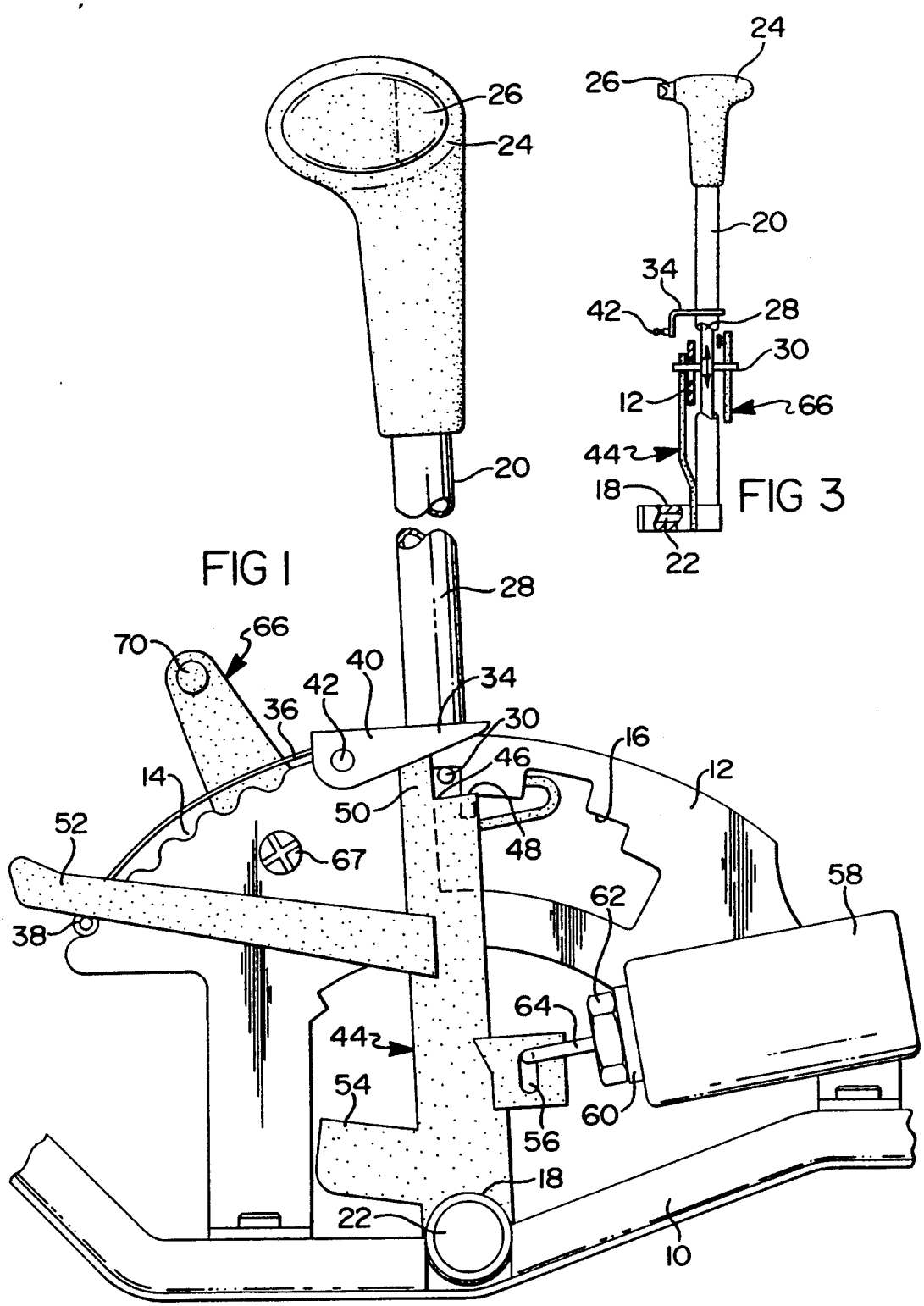

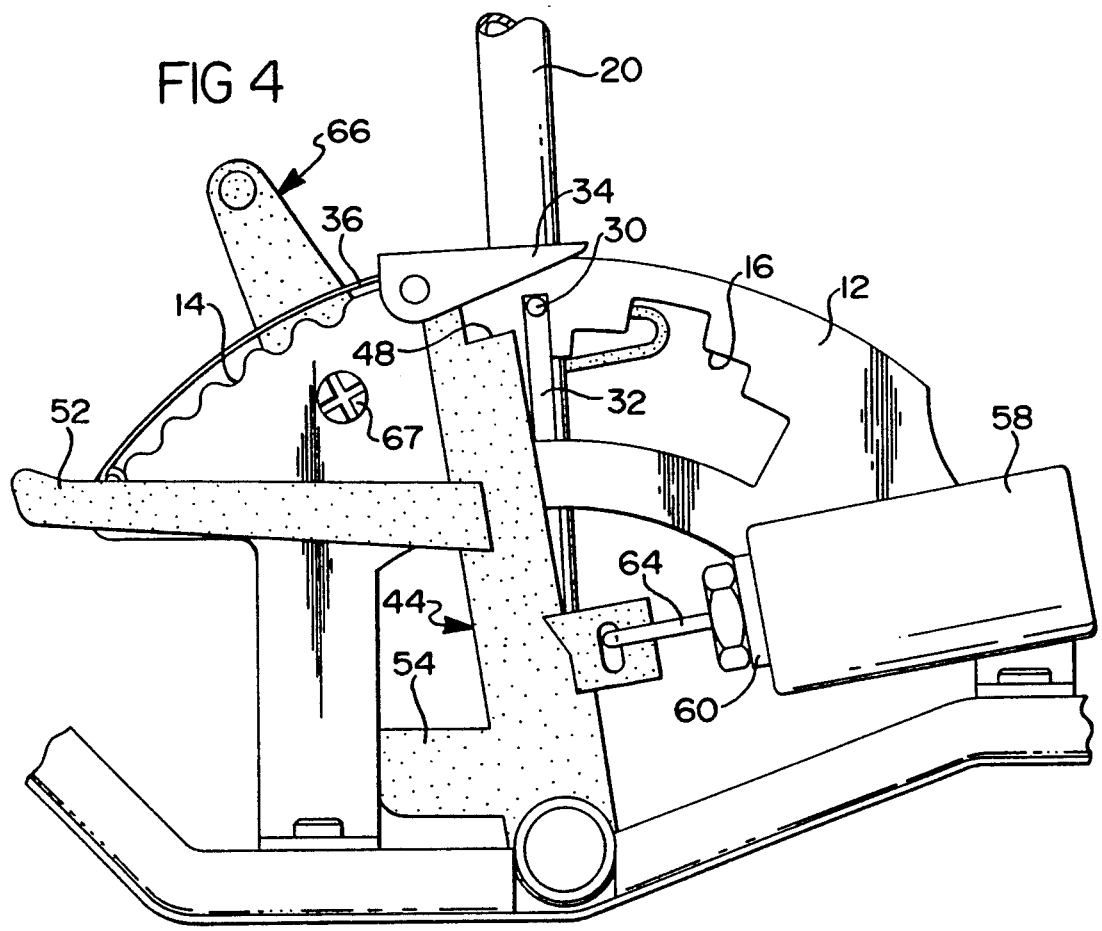

SHIFTER MOUNTED BRAKE-TRANSMISSION INTERLOCK

FIELD OF THE INVENTION

This invention relates to a brake-transmission interlock and particularly to a mechanism for permitting automatic transmission shifter movement from Park position only when the vehicle service brake is applied.

BACKGROUND OF THE INVENTION

In automobiles with an automatic transmission, it is a preferred practice for the operator to apply the service brakes at the time the transmission selector lever is moved from Park position to a Drive range. This practice not only assures that the vehicle is held stationary during this shift, but also assures that the operator's foot is not inadvertently pressing the accelerator pedal. This avoids the consequences of applying power at an unexpected moment. It has been proposed to provide an interlock mechanism to prevent shifting out of Park position unless a brake is first applied.

U.S. Pat. No. 4,473,141 to Mochida shows a shift lever and parking brake control which has a pin on a shift lever movable through a shift gate having a Park position. An electromagnetically controlled plunger spring is biased into the gate to block pin movement into or out of the Park position. The electromagnet is electrically connected in series with a parking brake switch and an ignition switch. This causes the plunger to be withdrawn by the electromagnet to permit shifting between Park and Reverse only when the engine is running and the parking brake is on.

U.S. Pat. No. 3,994,183 to Markl shows an electromagnetically controlled lock for a shift selector which is released for operation when ignition is turned on. A brake interlock is not included in this disclosure.

A brake-transmission interlock has been used in Audi production automobiles. In that case, a pin on a shift lever movable through a shift gate having a park position (similar to Mochida) is blocked from leaving the Park position by a solenoid operated blocking member in the path of the pin. The blocking member is pivotally mounted on the same axis as the shift lever for movement between blocking and release positions. A solenoid, actuated only when the service brake is released moves the blocking member to a blocking position and when the brake is applied a spring moves the member to a noninterfering position.

SUMMARY OF THE INVENTION

It is therefore an object of the invention to provide an improved brake-transmission interlock. One object is to provide a manual release for such an interlock. Another object is to provide a lever operated switch which disables the interlock circuit when the lever is moved out of Park position. Still another object is to provide such a disable function when the lever release button is depressed and the lever is yet in Park position.

The invention is carried out in an automobile having an automatic transmission, a service brake actuator, and an automatic transmission control lever movable into and out of a Park position, by a shift lever control comprising: blocking means movable between positions blocking and enabling movement of the shift lever out of the Park position; and control means for controlling movement of the blocking means characterized by an electric actuator for moving the blocking means between positions, an electric brake switch opened by movement of the service brake to brake-apply position and closed by movement to the brake-release position, an electric lever controlled switch actuated by operation of the shift lever, and an electric control circuit interconnecting the brake switch, the lever controlled switch and the electric actuator in such a manner that the actuator effects movement of the blocking means to blocking position when the brake switch and the lever controlled switch are closed.

BRIEF DESCRIPTION OF THE DRAWINGS

The above and other advantages of the invention will become more apparent from the following description, taken in conjunction with the accompanying drawings, wherein like references refer to like parts and wherein:

FIG. 1 is a side elevational view of a shift mechanism with brake interlock, according to the invention, shown in blocked condition;

FIG. 3 is a partly broken away rear view of the shift mechanism of FIG. 1;

FIG. 4 is a view similar to FIG. 1, with the shift mechanism shown in released condition;

DESCRIPTION OF THE INVENTION

Figure 2:
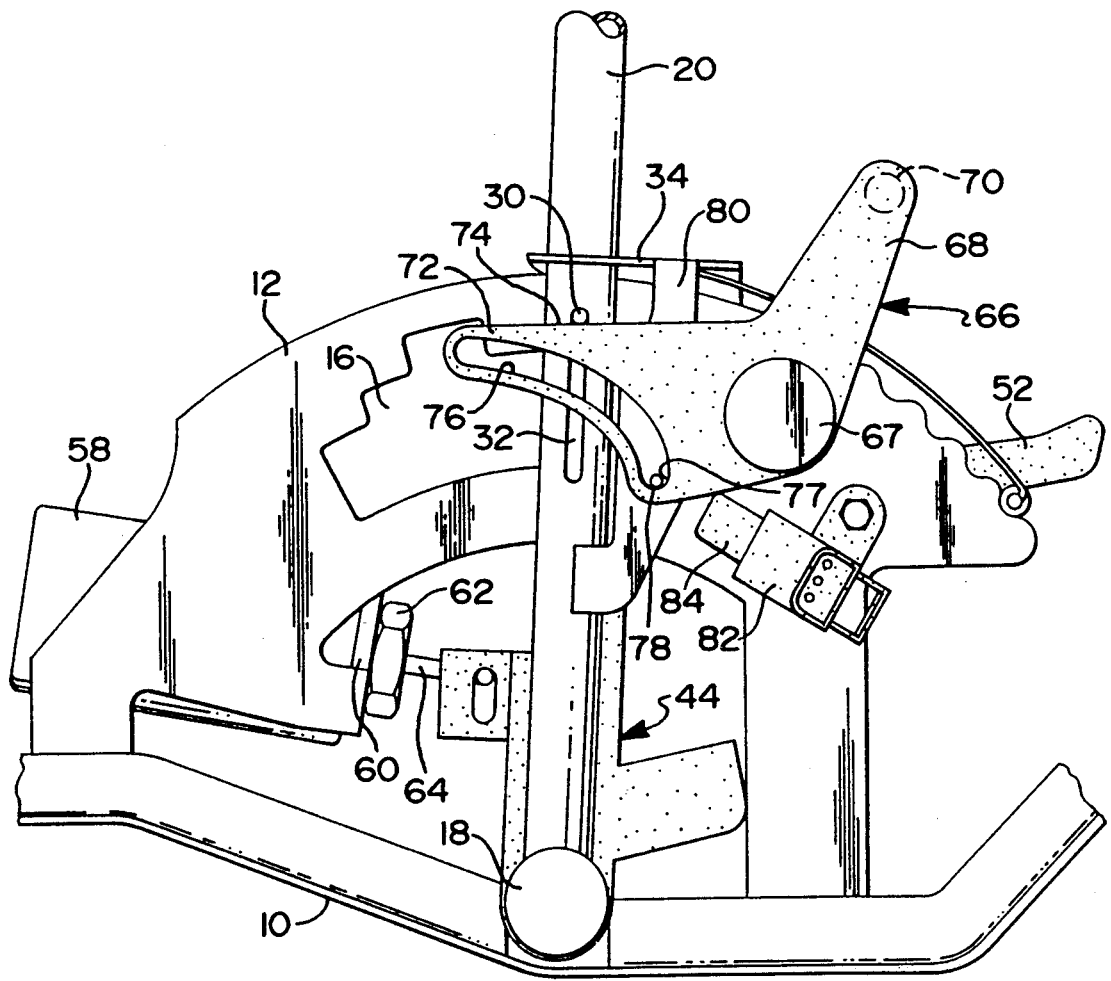
FIG. 2 is an opposite side elevational view of the shift mechanism of FIG. 1, shown in blocked condition.

Referring to FIGS. 1 and 2, a shifter mechanism according to this invention comprises a stamped steel base bracket 10, which mounts a vertical control plate 12. The control plate 12 has a rooster-comb-type detent formation 14 on its forward upper edge and has a cutout pattern forming a shift gate 16. A transversely-extending cylindrical hub 18 is fixed on the top of bracket 10 beneath the control plate 12. A shift lever 20 has a transversely mounted pin 22 on its lower end which is journaled in the hub 18 to a provide pivotal mounting for lever 20. The lever 20 has a T-shaped handle 24 at the top and a thumb-operated push button 26 at one end of the handle.

As best shown in FIG. 3, the shift lever 20 is tubular and contains an axially-shiftable release rod 28 which is operated by the push button 26. A pin 30 is secured transversely in the release rod 28 and extends outwardly through opposed slots 32 in the tubular lever 20. The pin 30 extends through the gate 16 in the control plate 12. The pin 30 together with the gate 16 define the P-R-N-N-D-L selector positions. The Park (P) position shown in FIG. 1 is defined by a deep upward notch in the gate which traps the pin 30 to prevent pivotal shift lever movement unless the pin 30 is depressed downwardly to clear the notch.

A small plate, 34 secured to the lever 20 just above the control plate 12, supports a spring steel detent element 36 having a free end 38 biased against the rooster-comb formation 14 to positively locate the lever 20 in any of several shift positions. The small plate 34 also has a downturned flange 40 which holds a knob 42 for attachment of a transmission control cable, not shown.

A blocking member or lever 44, which is preferably molded from a light strong polymer, is journaled on the pin 22 adjacent the lever and extends alongside the lever 20 toward the pin 30. The upper end of the member 44 has a notch 46 which defines a shoulder 48 and an upwardly extending finger 50. The shoulder 48 is positioned just beneath the pin 30; the finger 50 contacts the pin 30 when the release rod 28 is in its normal upper position and the member 44 is in its blocking position (shown in FIG. 1) preventing movement of the pin 30. The blocking member 44 can swing to a release position, as shown in FIG. 4, so that the pin 30 is free to move axially of the lever 20 when the release rod 28 is actuated. An arm 52 extends laterally of the member 44 to an operator-accessible site for manual operation of the member 44 in the event of failure of automatic operation. A stop 54 also extends laterally of the member 44 to engage a portion of the control plate 12 to limit the swing of the member 44 to release position. An elongated aperture 56 in one side of the blocking member 44 allows connection to a solenoid 58 which effects movement of the member 44 between blocking and release positions.

The solenoid 58 is mounted on an ear 60 protruding from the control plate 12 and is secured by a nut 62. The solenoid has an actuator rod 64 with a bent end which hooks into the aperture 56 of the blocking member 44. The actuator rod 64 is biased outwardly by an internal solenoid spring, not shown, to move the blocking member to release position when the solenoid is not energized. Upon energization, solenoid 58 retracts to pull the blocking member 44 to the position blocking movement of shift lever 20.

Figure 5:
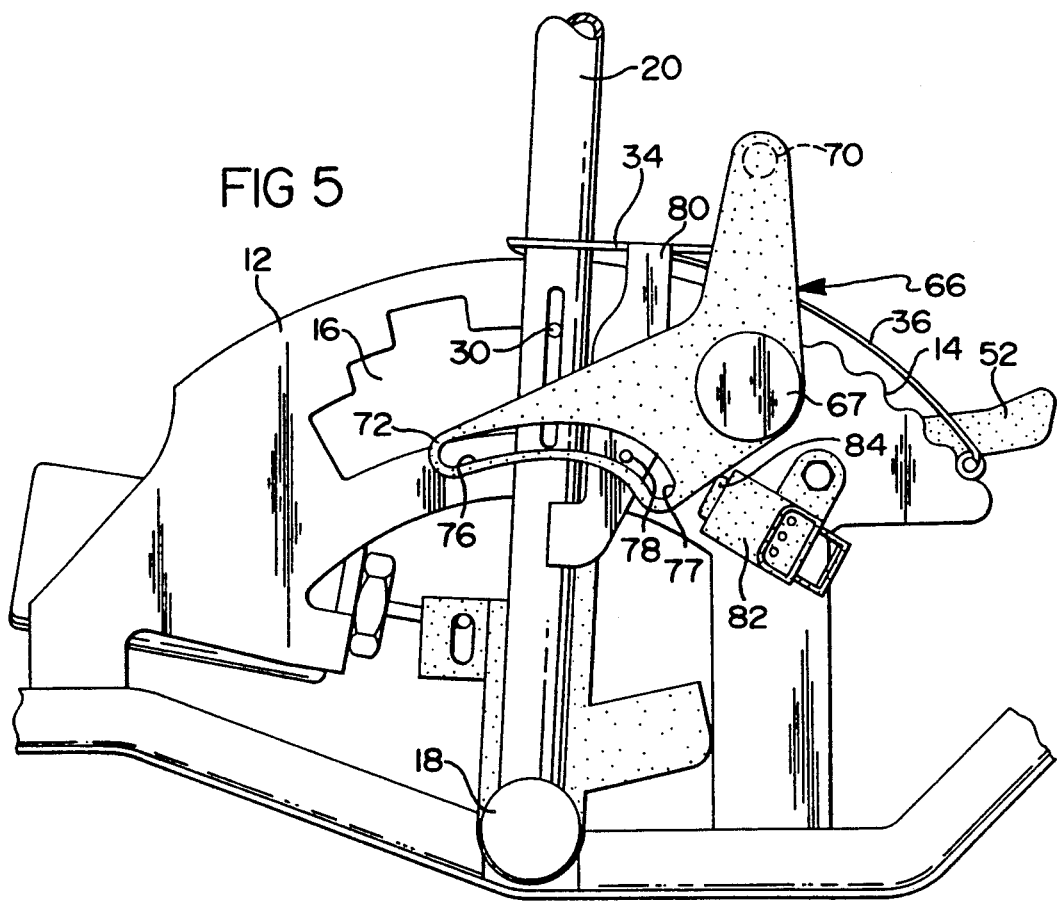
FIG. 5 is a view similar to FIG. 2, with the shift mechanism shown in released condition.

Referring to FIGS. 2 and 5, on the side of the control plate 12 opposite the blocking member 44, a molded polymer cam in the form of a bell crank 66 is pivotally mounted on a headed pin 67 which is fixed to the control plate 12. An upper arm 68 of the cam 66 carries a knob 70 for coupling to a transmission control cable, not shown. A lower arm 72 of the cam has an upper surface 74 lying in the path of the pin 30 such that the cam is rotated to release position by the pin 30 when the release rod 28 is moved to release position. An arcuate slot 76 in the arm 72 receives a pin 78 carried by the shift lever 20. The small plate 34 and the lever 20 support an arm 80, which carries the pin 78 for movement in the slot 76 when the lever is moved throughout its range. The pin 78 resides in one end 77 of the slot when in Park position and that end of the slot is shaped to accommodate cam rotation due to pin 30 movement.

The remainder of the arcuate slot 76 is shaped to be concentric with the hub 22 when the cam 66 is in release position. Thus the pin 78 can move in the slot 76 upon lever 20 movement, sliding along the lower surface of the slot, to hold the cam 66 in release position, even though the pin 30 may have returned to a position spaced from the cam, as shown in FIG. 5.

A lever operated shifter switch 82 mounted on the control plate 12 has an actuator button 84 engaging a lower surface of arm 72 of the cam 66 for operation upon cam movement. The switch 82 is normally closed (FIG. 2) when the button 84 is released and is moved to open position by the cam when the pin 30 is depressed or moved to release position (FIG. 5). Thus the switch 82 is closed only when the shift lever is in Park position and the pin 30 is in its upper or normal position. The switch is opened as soon as the push button 26 and release rod 28 are operated.

Figure 6:
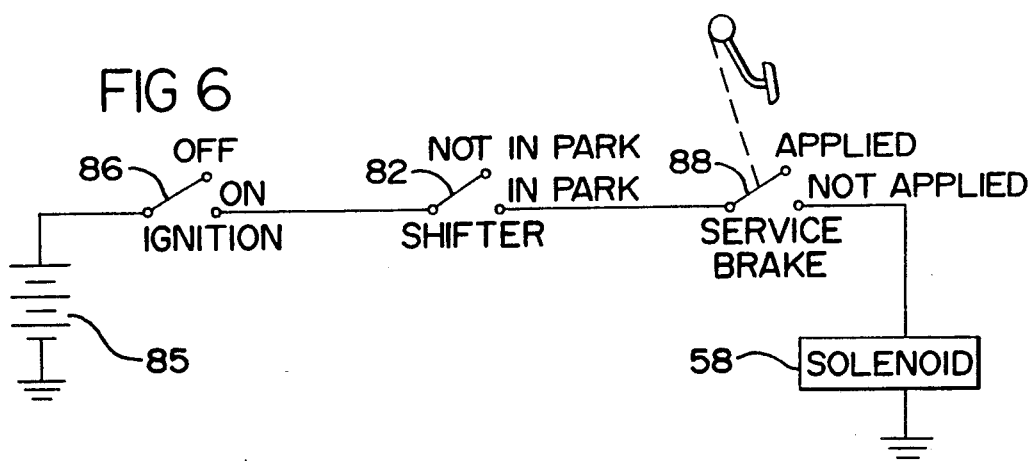
FIG. 6 is a control circuit for the shift mechanism according to the invention.

The circuit for energizing the solenoid 58 is shown in FIG. 6. The vehicle battery 85 is connected to the solenoid 58 through serially connected switches, comprising the vehicle ignition switch 86, a service brake switch 88 and the lever-operated shifter switch 82. The ignition switch 86 is closed when the ignition is on, the brake switch 84 is closed when the brakes are not applied, and the shifter switch 82 is closed when the shift lever is in Park (P) position and the release rod 28 is in normal position.

In operation, when the shift lever 20 is in Park position, the engine is running, and the release rod has not been operated, the solenoid 58 will be energized to pull the blocking member 44 into blocking position to prevent the pin 30 from being depressed, thereby locking the shift lever 20 into Park position. To remove the blocking member 44, the service brakes must be applied, thereby opening the switch 84 and releasing the solenoid 58 to return the blocking member 44 to release position. Thereafter, the push button 26 and release rod 28 may be operated to release the pin 30 from the Park position. Depression of the pin 30 operates the cam 66 to open the switch 82. Movement of the shift lever 20 from the Park position holds the shifter switch 82 open via the arcuate slot 76 and the pin 78. Thus the shifter switch 82 is held open when the push button 26 is returned to normal position. In the event of a circuit failure which holds the solenoid 58 in its energized state, the arm 52 of the blocking member 44 may be manually depressed to move it to the release position, thereby enabling movement of shift lever 20 to effect vehicle operation.

We claim:
1. In an automobile having an ignition switch, an automatic transmission, a service brake actuator, and an automatic transmission control lever movable into and out of a park position, a shift lever control comprising:
   blocking means movable between positions blocking and enabling movement of the shift lever only out of the park position; and
   control means for controlling movement of the blocking means characterized by
   an electric acutator for moving the blocking means between positions,
   a normally closed electric brake switch opened by movement of the service brake to brake-apply position and closed by movement to the brake-release position,
   a normally closed electric shifter switch,
   cam means coupling the shift lever to the shifter switch for opening the shifter switch only upon movement of the shift lever out of the park position, and
   an electric control circuit interconnecting the ignition switch, the brake switch, the shifter switch and the electric actuator in such a manner that the actuator effects movement of the blocking means to blocking position only when the ignition switch, the brake switch and the shifter switch are closed.

2. The shift control lever of claim 1, wherein the blocking member has manual override means, comprising a manually-operable arm extending from the blocking member to a manual access location.

3. The shift control lever of claim 1, wherein the control means include a shift gate defining a park position, the lever includes a manually-operable, axially-shiftable rod for releasing the lever from the park position of the gate, and the control means include a pivotal element coupling the shift lever to the shifter switch for opening the shifter switch upon axial movement of the rod for release from the gate and responsive to lever position for maintaining the shifter switch open condition when the lever is moved out of park position.

4. In an automobile having an automatic transmission, a service brake actuator, an electric circuit including an ignition switch, an automatic transmission control lever movable about an axis into and out of a park position and having an axially-shiftable release rod, and a gate for selectively trapping the lever in park position subject to release by axial movement of the release rod to a lever release position, a shift lever control comprising:
- a blocking member movable between positions blocking and enabling movement of the release rod to the lever release position when the lever is in park position; and
- blocking member control means for controlling movement of the blocking member, characterized by
- an electric actuator for moving the blocking member between positions,
- an electric brake switch opened by movement of the service brake to brake-apply position and closed by movement to brake-release position,
- an electric lever-controlled switch normally closed when the control lever is in park position and opened by operation of the release rod to release position, and
- an electric control circuit interconnecting the ignition switch, the brake switch, the lever-controlled switch and the electric actuator in such a manner that the actuator effects movement of the blocking member to its blocking position only upon concurrent closing of the ignition switch, the brake switch and the lever-controlled switch to thereby block movement of the release rod to release position and prevent movement of the control lever out of park position.

5. The shift control lever of claim 4, wherein the blocking member control means include a cam element coupling the lever and the lever-controlled switch, and a pin mounted on and movable with the release rod, the cam element having a first surface abutting the switch and a second surface for engagement by the pin, whereby the cam element actuates the lever-controlled switch when the release rod is moved to release position.

6. The shift lever control of claim 4, wherein the blocking member control means include a cam element coupling the lever and the lever-controlled switch and a pin mounted on and movable with the release rod, the cam element having a first surface abutting the switch and a second surface for engagement by the pin, whereby the cam element moves in response to the pin movement and actuates the lever-controlled switch to open condition when the release rod is moved to release position, and the cam element having a second surface engaged by the lever during lever movement out of park position for maintaining the cam in release position.

7. The shift lever control of claim 4, wherein the lever includes a first pin mounted on the release rod for movement therewith, and a second pin fixedly mounted on the lever for movement in an arcuate path upon lever movement about the said axis, a cam pivotally mounted for contact with the lever-controlled switch, the cam having a surface disposed in the path of the first pin such that the cam is moved to open the switch when the release rod is moved to release position, the cam having a second surface disposed along the path of the second pin such that the second pin slidably engages the second surface and holds the cam in switch-open position during lever movement out of park position.

* * * * *